April 14, 1936.   A. G. BELDEN ET AL   2,037,002
GRINDING MACHINE HAVING AN ELECTRICALLY CONTROLLED SIZING DEVICE
Filed April 16, 1932   6 Sheets-Sheet 1

WITNESS
Edward H. Goodrich

INVENTORS
ALBERT G. BELDEN
FRANK E. DROWN
By Clayton R. Jenks
ATTORNEY

April 14, 1936.  A. G. BELDEN ET AL  2,037,002
GRINDING MACHINE HAVING AN ELECTRICALLY CONTROLLED SIZING DEVICE
Filed April 16, 1932   6 Sheets-Sheet 3

WITNESS
Edward H. Goodrich

INVENTORS
ALBERT G. BELDEN
FRANK E. DROWN
Clayton L. Jenks
ATTORNEY

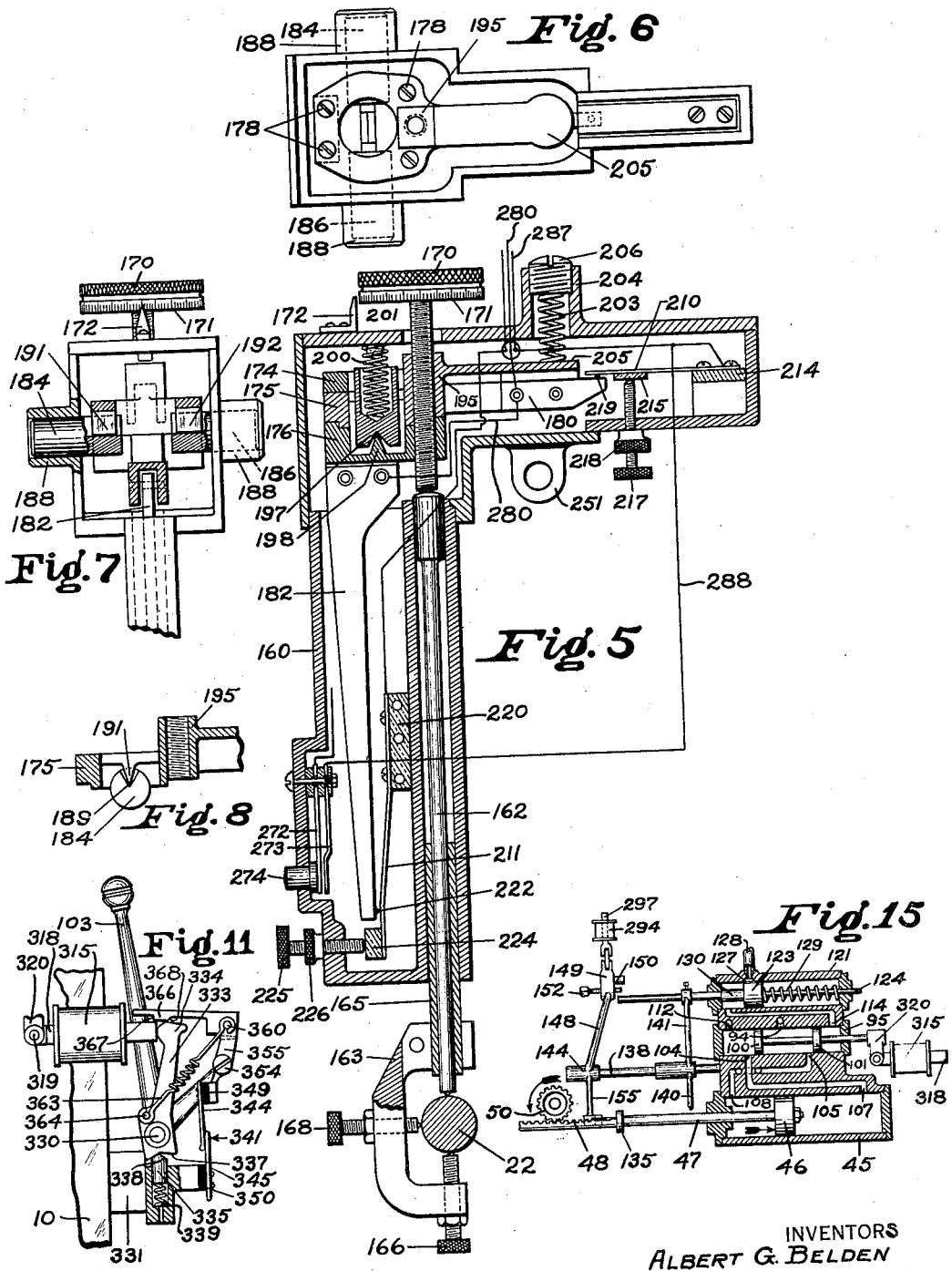

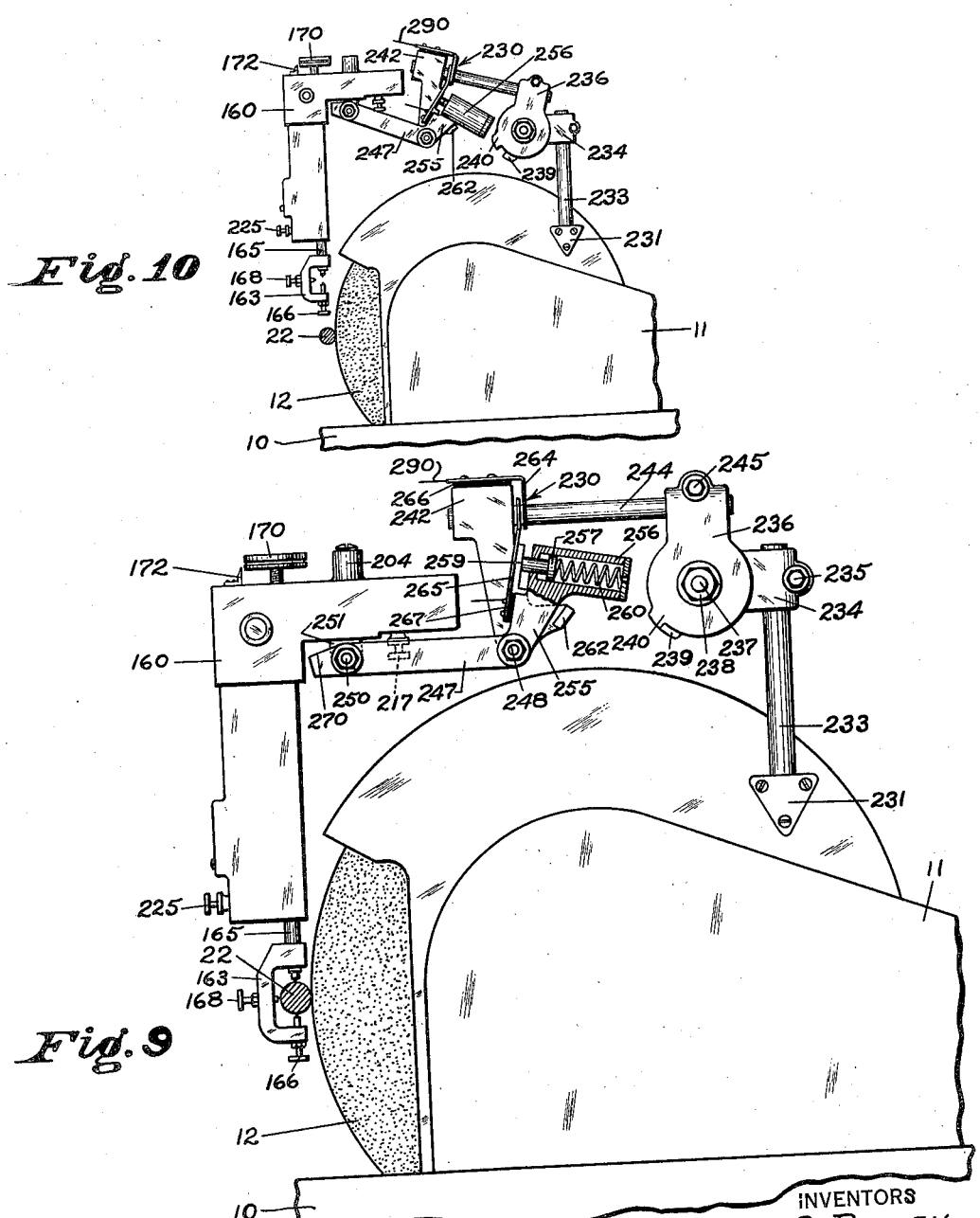

Patented Apr. 14, 1936

2,037,002

UNITED STATES PATENT OFFICE 2,037,002

GRINDING MACHINE HAVING AN ELECTRICALLY CONTROLLED SIZING DEVICE

Albert G. Belden and Frank E. Drown, Worcester, Mass., assignors to Norton Company, Worcester, Mass., a corporation of Massachusetts Application April 16, 1932, Serial No. 605,706

27 Claims. (Cl. 51—95)

This invention relates to machines for precision grinding and especially to a fluid pressure operated grinding machine which is adapted to successively finish duplicate cylindrical work surfaces with an extreme degree of accuracy.

Heretofore, various devices have been utilized to regulate feed mechanisms adapted to control the infeed of a grinding wheel as it abrades a piece of work. However, these former control mechanisms have been unsatisfactory and are not sufficiently accurate to meet the present day demands for precision high speed machinery wherein the diameter of a finished work piece, such as the familiar type of wrist pins utilized in the modern high speed internal combustion engines, must lie within at least one ten-thousandth of an inch (0.0001″) of accuracy. It is accuracies of this sort for bearings and high speed rotating parts which have made automotive and airplane engines extremely dependable for long periods of uninterrupted service. Formerly it has been the usual practice to attain such accuracies in cylindrical work by means of slow, laborious and expensive lapping operations. However, with the present invention, successive work blanks may be automatically and rapidly finished in a single grinding operation to the exact required size and surface within a minimum of time.

With such conditions of extreme accuracy demanded, many factors must be taken into consideration which have heretofore been deemed negligible. For instance, the final grinding operation must be completed while the work piece being ground is subjected to a minimum of pressure, since even a minute displacement of the work upon its supporting centers due to the compression of an oil film would cause displacement of the work and result in inaccuracies. Furthermore, in every grinding machine there is usually a small amount of spring or stress in various parts of the machine which must be taken into consideration since these strains tend to cause appreciable variation in the final diameter of the finished work piece. As a consequence, such strains must be relieved during the finish grinding operation.

It has been proposed to equip various types of grinding machines with calipering devices which engage the work during grinding and thereby regulate a mechanical wheel feed. However, such devices have required the use of intricate mechanisms and have been uncertain in their operation, due to a time lag in the shifting of clutches and gears.

It is therefore the principal object of our invention to provide an automatic grinding machine comprising an electrical device responsive to reduction in work size which serves to control a fluid pressure operated wheel feed mechanism and thereby accurately regulate a precision grinding operation.

It is a further object of our invention to provide a fluid pressure operated grinding wheel feed mechanism which is automatically and electrically controlled by a gauging or calipering device responsive to a variation in work size and serving to successively control a series of electrical circuits and cause first a stopping of the wheel feed when the work has been reduced to a given size and permit a dying out finish grinding operation and thereafter a positive withdrawal of the wheel from the work when the correct work size has been attained.

A further object is to provide a fluid pressure operated grinding machine in which the fluid pressure mechanism is controlled in timed relation with the infeed movement of the grinding wheel so as to cause a change in the feeding rate of the wheel when it has reached a predetermined position relative to the work.

It is a further object to provide an improved type of feed mechanism in which the wheel feed may be changed from a fast to a slow rate and the position at which this change is made may be varied.

A further object is to provide an electrical control mechanism so arranged that the caliper cannot control the wheel feed mechanism when said caliper is out of contact with the work.

With this and other objects in view as will be apparent to one skilled in the art, our invention resides in the combination of parts set forth in the specification and covered by the claims appended hereto.

In accordance with the embodiment of this invention illustrated in the drawings, we have provided a fluid pressure operated grinding machine which is electrically controlled by a gauging or calipering device, hereafter referred to as a calipering device, which serves to successively cause the wheel to approach and grind the work from an initially remote position and to terminate the grinding operation when the work has been reduced to a predetermined size. This mechanism may also provide a dwell in the wheel feed when the work has reached a measured size so that the wheel will take a dying out cut and at the same time finish the work surface while the work is being reduced to its final size; after which the wheel is caused to recede to a remote position, thereby stopping the grinding operation. In this construction, we employ a feeler contacting with the work as it is ground, which controls an electrical mechanism, having preferably two circuits operated in turn when the work has been reduced successively to two predetermined sizes. The electric mechanism is connected to operate fluid control valve mechanism and thereby control the wheel movement. We may also employ a low energy circuit which is responsive to the movement of the calipering device, and a high energy circuit controlled thereby through a relay which operates the valve control mechanism. The fluid pressure operated mechanism preferably comprises a throttle and a reversing valve which regulate the rate and direction of the wheel feed under the control of the calipering device. The valve mechanism may be so constructed that the rate of the wheel feed may be changed automatically from a fast to a slow grinding feed when the wheel has reached a predetermined position relative to the work. The electric control mechanism may be so constructed that the caliper may be moved into and out of contact with the work and the feed mechanism will not be controlled by the caliper except when the latter is in an operative position. In the particular construction illustrated, the grinding wheel is fed toward and from the work by means of a feed screw held against longitudinal movement and rotated within a portion of the wheel slide which is threaded on said screw. Rotation of the feed screw is accomplished by a fluid pressure operated motor, gear connected thereto.

The features of our invention will be clearly understood and appreciated in view of the following description of a preferred embodiment, thereof, selected for purposes of illustration and as shown in the accompanying drawings, in which:

Figure 5 is a view in longitudinal vertical section of the calipering device and its casing;

Figure 6 is a plan view of parts of the calipering device with the top of the casing removed;

Figure 7 is an end fragmentary view, taken from the left in Figure 5 of the upper portion of the calipering device with the end of the casing removed;

Figure 8 is a fragmentary sectional view of a portion of the tripping lever;

Figure 9 shows the calipering device and its support when in engagement with a piece of work;

Figure 10 shows the calipering device swung out of engagement with the work;

Figure 11 shows the starting lever and its associated mechanism in position to shift the reverse valve into a forward feeding position;

Figure 15 is a diagrammatic showing of the relative positions of the fluid pressure operated parts upon the reversal of the reverse valve to its rearward feeding position.

Figure 1:
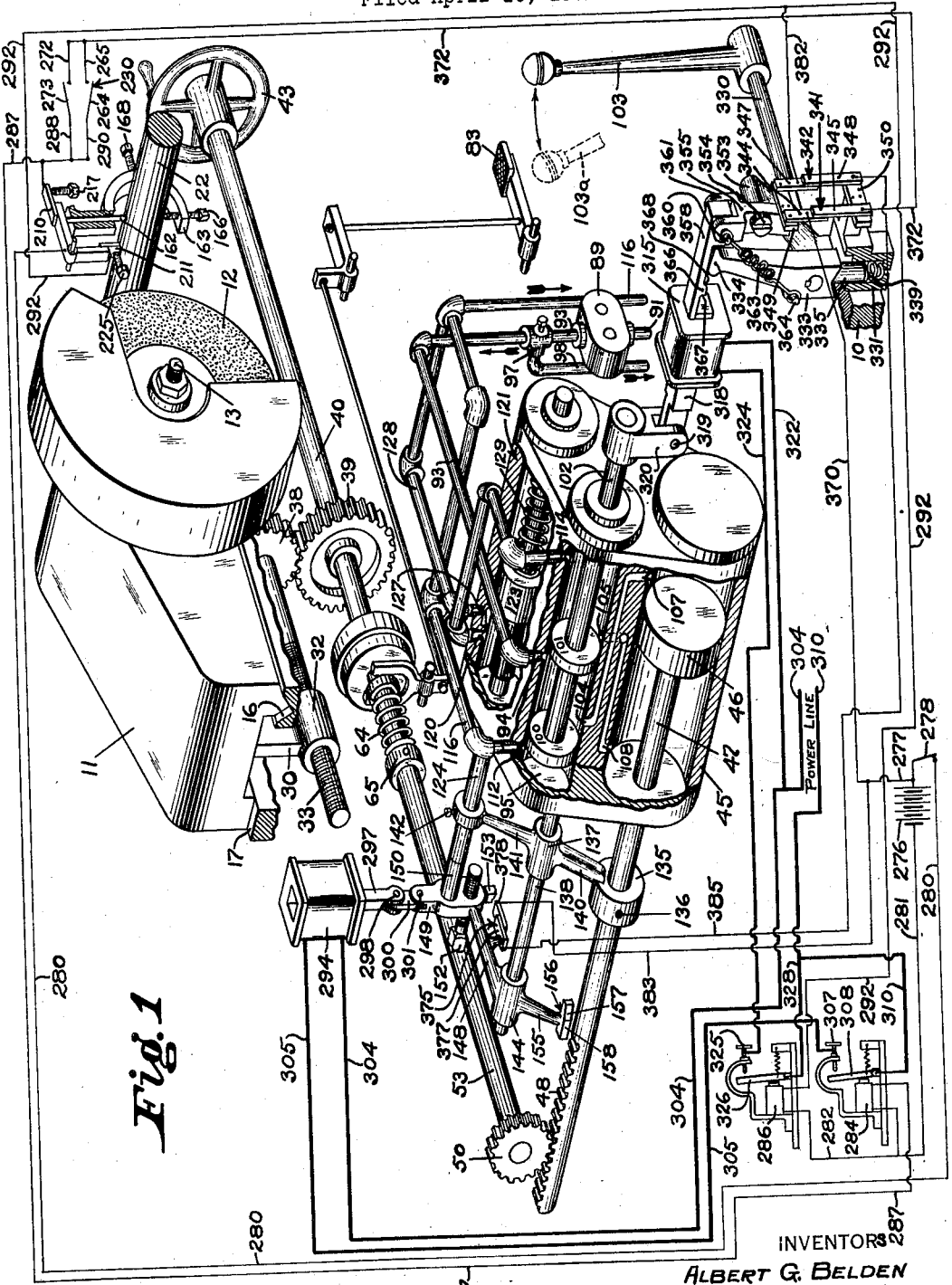
Figure 1 is a fragmentary perspective view of the feeding mechanism of our grinding machine diagrammatically showing the operative parts and a wiring diagram connected therewith.

As illustrated in the accompanying drawings, which show one embodiment of this invention, we have provided a grinding machine comprising a base 10, upon which is mounted a grinding wheel slide 11, having a grinding wheel 12 mounted upon a shaft 13, journalled within the wheel slide and rotatably driven by a belt 14, passing over a pulley 15 affixed to said shaft. The wheel slide is mounted in the accustomed manner upon V and flat ways 16 and 17 and is arranged for a transverse, feeding movement to cause the wheel to move toward and from the work. A work table 18 is mounted within V and flat ways 19 and 20 on the base for longitudinal movement thereof. The table 18 is provided with a headstock 21 and a tailstock (not shown) whereby a work piece 22 may be rotatably supported therebetween for a grinding operation. The work may be rotated by any convenient and well known method which, in the present instance, for purposes of illustration, comprises a motor 24 connected by a belt 25 to rotate a spindle 26 within the headstock rotatably engaging one end of a workpiece 22. If desired the work table may be traversed longitudinally of the base by any convenient method. No mechanism has been illustrated to accomplish this, since it does not constitute a necessary part of the present invention.

The wheel slide is moved by a fluid pressure mechanism connected thereto. While this may be accomplished by many types of fluid motors and by various means of applying the motor power to the slide, we have illustrated the motor as connected to the slide through an intermediate cross feed screw. As clearly shown in Figs. 1, 2, and 3, the wheel feeding mechanism includes a depending arm 30, affixed to the wheel slide 11 and provided with a threaded portion 32 which engages a feed screw 33, journalled within the base 10 in the bearings 35 and 36 respectively. A gear 38 is fixedly mounted on the outer end of the feed screw and is maintained constantly in mesh with a gear 39 secured to a shaft 40 journalled within the base of the machine. The shaft 40 may be manually rotated by means of a hand wheel 43 secured to the outer end of shaft 40 which projects through the front of the machine, or shaft 40 may be rotated by a power operated mechanism which in the present instance comprises a fluid pressure operated feed mechanism. It will thus be apparent that any rotation imparted to shaft 40, whether manual or by power, will be transmitted through gears 39 and 38 to rotate feed screw 33 within arm 30 and cause the grinding wheel to be moved towards or from the work.

To rotate shaft 40 by power and thereby cause the grinding wheel to be automatically fed towards or from the work, we provide a suitable fluid pressure operated motor comprising a cylinder 45 which is fixed relative to the base of the machine and has a fluid pressure operated piston 46 slidably mounted for longitudinal movement therein. The piston is secured to one end of a slidably mounted piston rod 47, the other end of which is provided with a rack 48 in constant engagement with a rotatable gear 50. Gear 50 is suitably fastened to one end of a sleeve 53 journalled within a bearing 54 in the base 10 and arranged to support a reduced portion 55 of shaft 40 for free rotation therein. To transmit rotation from sleeve 53 to shaft 40 and thereby cause the grinding wheel to be moved toward or from the work by fluid pressure operated mechanism, a suitable clutch is provided which may comprise any familiar type of clutch but in the present instance, for clarity of illustration, is shown as a cone clutch. A clutch member 57 is keyed to the forward end of sleeve 53 and is provided with an engaging face 58 which is frictionally engaged by the conical face 59 of a clutch member 62 slidably keyed upon shaft 40. The clutch members are normally maintained in positive driving engagement with each other by means of a spring 64 compressed between a collar 65 secured to shaft 40 and clutch member 62. It will thus be seen that the application of fluid pressure within one end of cylinder 45 will cause piston 46 and rod 47 to slide longitudinally and rotate gear 50 and sleeve 53 transmitting rotary motion to the feed screw 33 by means of gears 39, 38, and shaft 40 when the clutch members 57 and 62 are in positive driving engagement, thereby causing the grinding wheel to be automatically fed towards or away from the work depending upon the direction of movement of piston 46 within cylinder 45.

Whenever it is necessary to feed the grinding wheel manually by rotation of hand wheel 43, the clutch members are disengaged, thereby disconnecting shaft 40 from the fluid pressure operated wheel feed mechanism. To accomplish this, we preferably provide the clutch member 62, which is slidably keyed upon shaft 40, with a reduced portion 67 terminating in a flange 68 which may be engaged by yoke member 69 pivotally mounted at its upper end upon a bracket 72 affixed to the machine base 10. The lower end of said yoke member is pivotally connected to a link 73 also pivoted to the short arm 74 of a bell crank 75 pivotally secured to a bracket 77 fastened to the base 10. Bell crank 75 is further provided with a long depending arm 78 pivotally connected to a link 80 which is in turn pivoted at its forward end to a short arm 82 of a foot treadle 83 mounted to rock within a bracket 84 secured to the base of the machine. It will thus be apparent that whenever the machine operator desires to disconnect the power feed mechanism, it is only necessary to step on the foot treadle 83 which acts through link 80, bell crank 75 and link 73 to rock yoke member 69 upon the pivot at its upper end and slide clutch member 62 along shaft 40 out of driving engagement with member 57, thus disconnecting shaft 40 from the power feed mechanism.

To supply fluid under pressure for operating the motor 45, power from any suitable source may be applied to rotate a driving pulley 85 secured to a drive shaft 86 journalled within a bearing 88 fastened to the base 10, said shaft being connected at its other end to rotate a fluid pressure pump 89. Fluid is fed to the pump through a pipe 91 from a supply tank 92 and expelled from the pump under pressure through a pipe 93 connecting with a port 94 in a reversing valve 95. Pipe 93 also communicates with a relief valve 97 which relieves excess fluid pressure and serves to return excess fluid to the supply tank 92 through a pipe 98 connecting therewith.

The reverse valve 95 is preferably of the familiar balanced piston type wherein two pistons 100 and 101 are mounted in spaced relation upon a piston rod 102 which may be shifted by a lever 103 utilized to move said pistons and cause fluid pressure communication between various ports to direct the travel of piston 46 within the wheel feed cylinder 45 and thereby cause the grinding wheel to approach or recede from the work. The reverse valve cylinder is also provided with two ports 104 and 105 which are connected by passages with ports 107 and 108 respectively which lie at opposite ends of the wheel feed cylinder 45. It will thus be apparent that fluid pressure from the pump 89 may enter a chamber 110 of the reverse valve between the pistons 100 and 101 from port 94 and be directed either to port 104 or port 105 depending upon the position of pistons 100 and 101 and thus be directed either to port 107 or port 108 thereby creating fluid pressure upon either side of piston 46 tending to move it within cylinder 45 and cause a wheel feed towards or from the work as desired. The reverse valve 95 is further provided with two exhaust ports 112 and 114 whereby exhaust fluid from the wheel feed cylinder may be returned to the supply tank 92. Exhaust port 112 communicates directly with the fluid supply tank by means of a pipe 116. Fluid is passed therethrough during the rearward movement of the grinding wheel and piston 46, since it is advantageous to withdraw the grinding wheel as rapidly as possible from the work. Exhaust port 114 receives exhaust fluid from the wheel feed cylinder only during the infeed of the grinding wheel towards the work and as a consequence is directly connected with a port 120 in a feed control valve 121 which throttles the return of exhaust fluid to the supply tank and thereby positively controls the rate of infeed of the grinding wheel.

Figure 12:
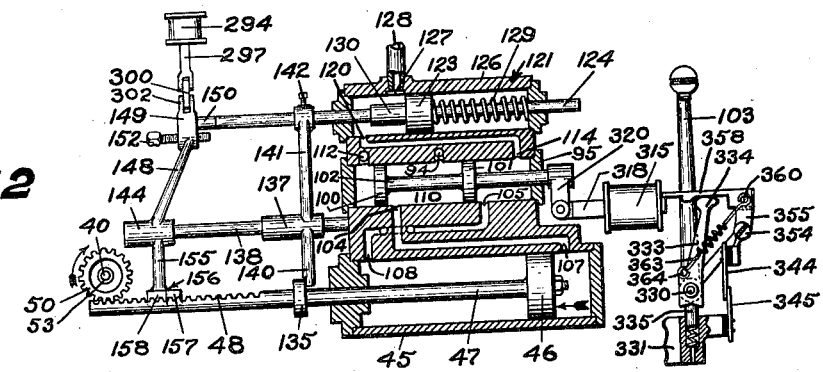
Figure 12 is a diagrammatic view showing the relative position of the fluid pressure operated parts just after the reverse valve has been shifted to forward feeding position.
Figure 13:
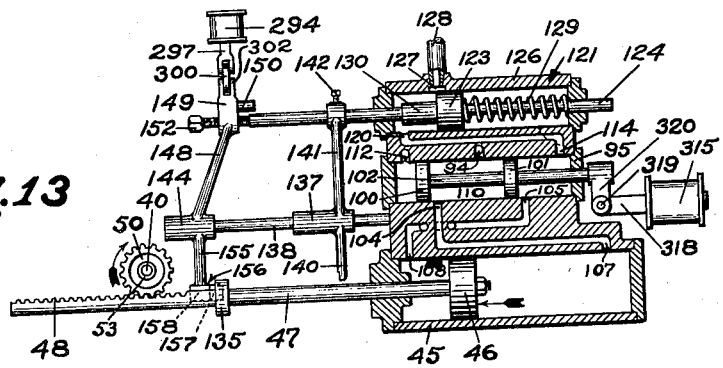
Figure 13 is a diagrammatic view showing the relative position of the fluid pressure operated parts during the forward grinding feed.
Figure 14:
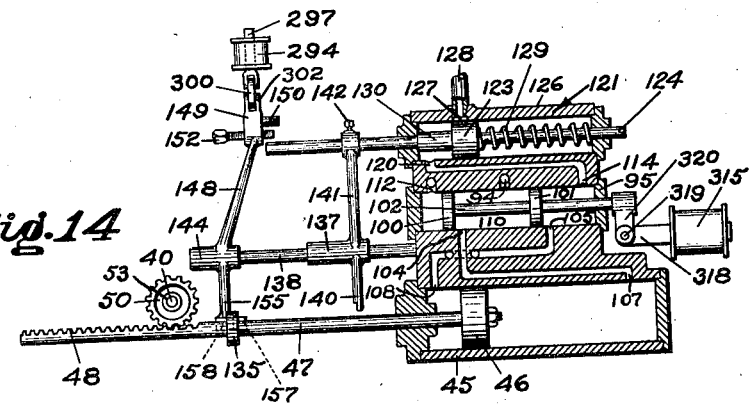
Figure 14 is a diagrammatic view showing the relative position of the fluid pressure operated parts just at the termination of the grinding feed.

The feed control valve may be any suitable type of throttling valve, but in the present instance comprises a spring pressed piston slidable within a cylinder arranged to cut the flow of exhaust fluid by regulated amounts through an elongated port communicating with the fluid supply tank as shown in Figures 4, 12, 13, and 14. A piston 123 secured to a piston rod 124 is slidably mounted within the feed control valve cylinder 126 so that said piston may be moved to entirely or partially cover an elongated exhaust port 127 and thereby control the amount of fluid flow through exhaust pipe 128 which connects port 127 with exhaust pipe 116. Piston 123 is constantly urged towards a position at which it will completely cover the exhaust port 127 and stop the infeed of the grinding wheel. This is accomplished by means of a coil spring 129 loosely mounted upon piston rod 124 and maintained under compression against the cylinder head at one end and the piston at the other end thereby tending to move the piston towards the left to cover port 127. The piston rod 124 is provided with an enlarged portion 130 adjacent to the left side of piston 123 arranged to engage the cylinder head and thereby limit piston movement towards the left when it has completely covered the port 127 as shown in Fig. 14.

It will thus be apparent that whenever the grinding wheel is being fed towards the work, the reverse valve pistons 100 and 101 are in the positions as shown in Figures 1, 12, 13, and 14. This directs the flow of fluid under pressure from pump 89 through pipe 93, port 94 into chamber 110, out through port 104 in reverse valve and through port 107 into the rear of the wheel feed cylinder 45 causing piston 46 to move towards the left and a consequent infeed of the grinding wheel. During this infeed movement of the grinding wheel, exhaust fluid from the left side of piston 46 within cylinder 45 is permitted to flow out through port 108 into the reverse valve through port 105, out through port 114 and into the feed control valve through port 120. The flow of exhaust fluid entering the feed control valve enters the elongated port 127 by a regulated amount which is dependent upon the extent at which piston 123 covers said port. Exhaust fluid is free to flow from port 127 through pipe 128 into pipe 116 and then back to the supply tank 92.

The feed control valve serves to definitely control the rate of exhaust fluid returned to the tank during the wheel infeed and thereby accurately regulates the rate of wheel feed towards the work. Whenever the wheel is being moved away from the work, the reverse valve pistons 100 and 101 are in the positions shown in Figures 2, 4, and 15. This position of the reverse valve pistons serves to direct the fluid pressure from pump 89 through pipe 93, port 94, into chamber 110 in the reverse valve, out through port 105 and into the left-hand end of the wheel feed cylinder 45 causing piston 46 to move toward the right resulting in a consequent withdrawal of the grinding wheel from the work. During this rearward movement of piston 46, fluid is forced from the right-hand end of cylinder 45 out through port 107 into the reverse valve through port 104 and through exhaust port 112 and pipe 116 which leads directly to the supply tank 92. It will be apparent that during the rearward feeding movement of the wheel, the exhaust fluid is in no way impeded, hence the grinding wheel will rapidly withdraw from the work until piston rod 47 is engaged by a stop screw 131 in the rear of cylinder 45 which serves to positively locate the rearward position of the grinding wheel when withdrawn from the work by power operated mechanism. As clearly shown in Fig. 2 stop screw 131 is threaded into the rear cylinder head of the wheel feed cylinder 45 and secured in adjusted position by means of a lock nut 132.

The rate of wheel approach and grinding feed may be automatically controlled mechanically and stopped either by a mechanical device or by electrical means cooperating therewith, which will be described later. Since the feed control valve spring 129 is always acting under pressure to keep piston 123 over exhaust port 127, we have provided mechanism to automatically regulate the extent of closure of exhaust port 127 during the grinding operation, thereby accurately controlling the rates of infeed of the grinding wheel. A collar 135 is slidably mounted upon the piston rod 47 between the wheel feed cylinder 45 and rack 48 and secured in position by means of a set screw 136. A member 137 slidably mounted upon a guide rod 138 supported adjacent the machine base substantially parallel to piston rods 47 and 124, is provided with a depending arm 140 engageable with said collar 135 and an upstanding arm 141 adjustably clamped by means of a set screw 142 to the piston rod 124 of the feed control valve as clearly shown in Figures 1, 2, and 4. It will be apparent that as the grinding wheel recedes from the work and piston rod 47 and piston 46 moves rearwardly, collar 135 engages the depending arm 140 causing member 137 to slide along the guide rod 138 and arm 141 to move piston rod 124 rearwardly, thereby moving the piston 123 rearwardly to completely uncover exhaust port 127 prior to the next grinding operation.

Figure 2:
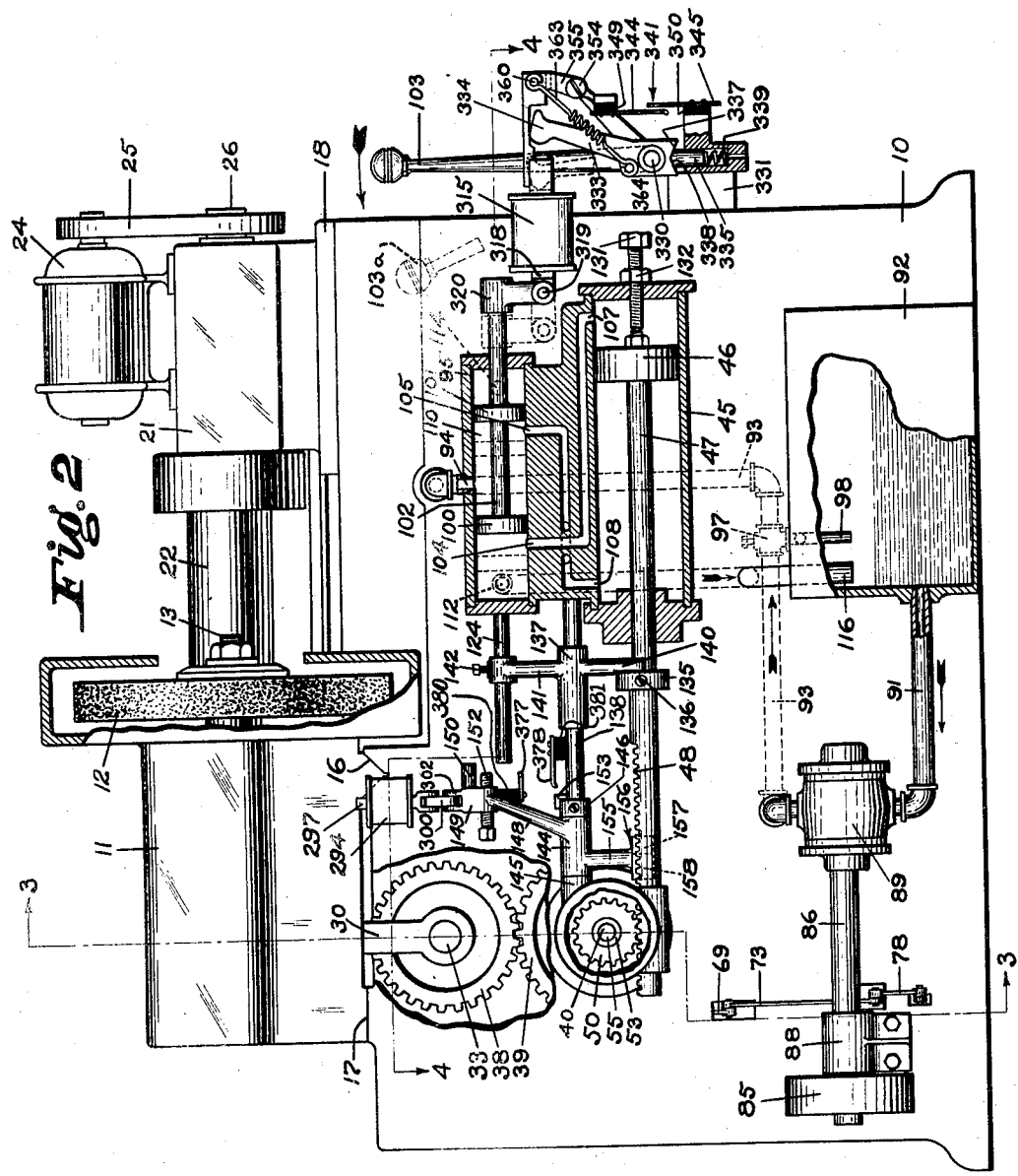
Figure 2 is a fragmentary rear view of the machine.
Figures 3, 4:
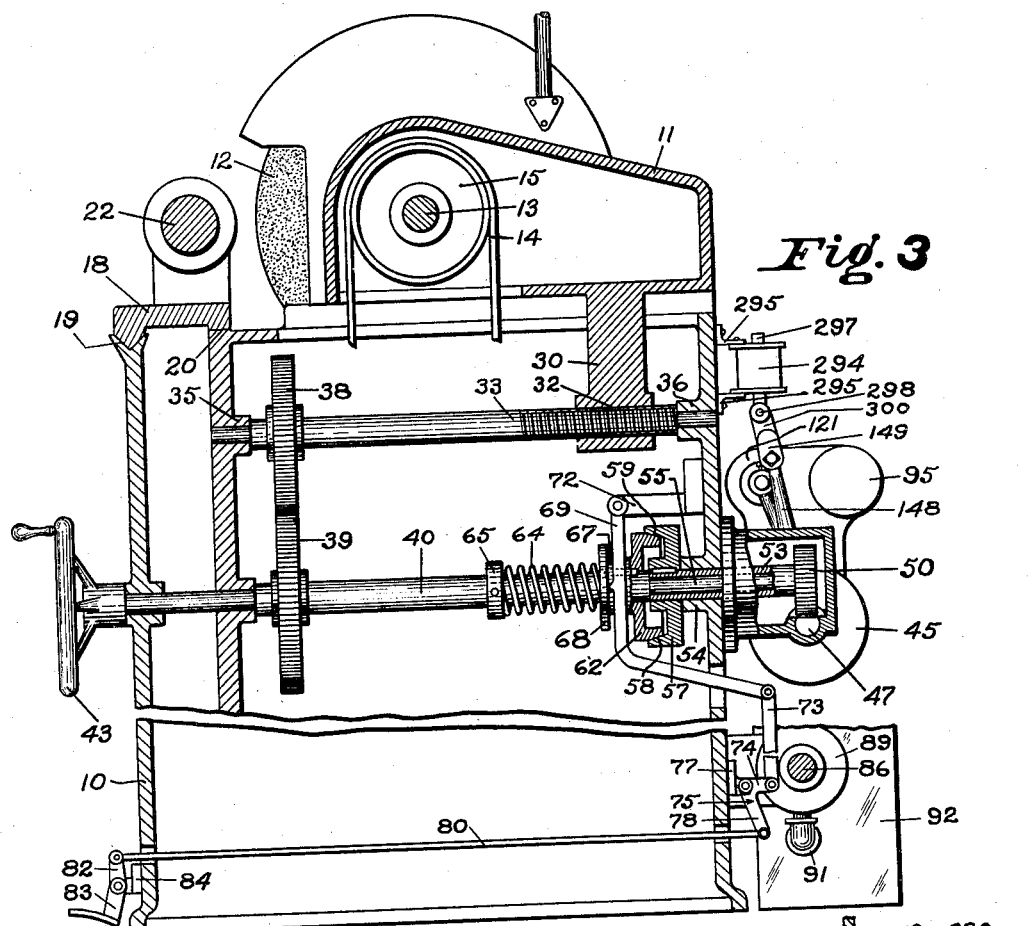
Figure 3 is a sectional view taken approximately along the line 3—3 of Figure 2.
Figure 4 is a sectional view taken approximately along the line 4—4 of Figure 2.

When the reverse valve 95 has been shifted to such a position as to cause piston 46 and piston rod 47 to again move forward, the feed control valve piston 123 and piston rod 124 will tend to move forward and close port 127 due to the pressure of spring 129 thereby stopping the wheel feed unless some device is provided to control the forward movement of piston 123 over exhaust port 127 during the grinding operation. To control such piston movement we have provided a device as illustrated in Figures 1, 2, and 4 comprising a bell crank 144 journalled on rod 138 between bearing 145 and collar 146. Bell crank 144 is provided with an arm 148 terminating in an enlarged portion or head 149 which carries a protruding stud 150 and a set screw 152 adjustably threaded therein, said stud and screw being mounted in such positions that either one may be brought into axial alignment and positive engagement with the end of rod 124 by the angular movement of lever 144 upon guide rod 138, thereby limiting the extent of closure of piston 123 over port 127. The bell crank lever 144 is further provided with a depending arm 155 terminating in a head 156 which has cam surfaces 157 and 158 engageable by collar 135 on shaft 47. The action of gravity tends to normally maintain lever 144 in the position shown in Figures 1, 4, and 12 with the head 149 supported by an abutment 153 affixed to the base 10 and thus positioning stud 150 in engagement with the end of piston rod 124 thereby preventing piston 123 from covering port 127 and maintaining the feed control valve wide open permitting a rapid infeed of the grinding wheel as it approaches the work.

When the lever 144 rests in the above mentioned position, cam surfaces 157 and 158 lie in the path of collar 135 as it moves toward the left during the wheel infeed. The collar 135 is so positioned upon piston rod 47 that it engages cam surface 157 just prior to engagement of the grinding wheel with the work surface. The forward movement of said collar along cam surface 157 serves to rock lever 144 about its supporting shaft 138 thereby lifting stud 150 from engagement with piston rod 124 and presenting screw 152 in the path of said rod. The screw 152 is so adjusted within head 149 that its end engageable with piston rod 124 lies slightly to the rear of the engaging face of stud 150 thereby permitting a forward movement of piston rod 124 causing piston 123 in the feed control valve 121 to partially close port 127 and throttle the flow of exhaust fluid from the wheel feed cylinder, retarding the movement of piston 46 and piston rod 47 and changing the rapid infeed of the wheel to a grinding feed as clearly illustrated in Fig. 13.

It will be apparent that the adjustment of screw 152 within head 149 serves to positively control the extent of closure of exhaust port 127 and the machine operator may by adjusting said screw provide any grinding feed desired. When the grinding wheel has reached the end of its predetermined feed, automatic electrically operated mechanism, which will be described later, serves to lift screw 152 from contact with piston rod 124 permitting the action of spring 129 to instantly move piston 123 over exhaust port 127 and close the flow of exhaust fluid from the wheel feed cylinder, thereby automatically stopping the wheel feed at a predetermined position. However, to prevent breakage of the machine should said stop mechanism fail to function, we have provided mechanical means whereby the infeed of the grinding wheel may be automatically terminated when the wheel has reached a predetermined position. During the infeed of the grinding wheel, collar 135 is moving to the left with piston rod 47 and moving along cam surface 157 thereby serving to gradually lift screw 152 in the head 149 of lever 144. Just as collar 135 runs off cam surface 157 onto cam surface 158 screw 152 is lifted clear of rod 124 and spring 129 acts instantly to completely close the feed control valve 121 thereby preventing further infeed of the grinding wheel.

To facilitate grinding accuracy and rapid quantity production, our machine utilizes automatic means for controlling the fluid pressure actuated power feed mechanism whereby successive pieces of work may be rapidly, precisely and automatically ground to the same size. This means includes the use of a gauging or calipering device of any suitable construction which is responsive to a reduction in work size and engageable with the work during grinding and arranged to control various electrical circuits and electrical devices connected therewith, whereby the valves controlling the fluid pressure system may be operated to precisely control the grinding operation as the work is reduced in size. Various types of electrical mechanisms may be employed and this invention contemplates broadly the use of any suitable electrical control mechanism arranged to operate a fluid pressure actuated motor causing a wheel feed. The calipering device, illustrated, includes an L shaped casing or head 160 within which is mounted a feeler rod 162 and a tripping lever. A caliper frame 163 is secured to the lower end of a sleeve member 165 projecting from the lower portion of casing 160 and is provided with an adjustable contact screw 166 diametrically opposite the end of the feeler rod 162 and with another adjustable contact screw 168 arranged to bear laterally upon the work to secure screw 166 and the end of feeler rod 162 at the maximum diameter of the work 22 as illustrated in Figure 5.

In order to reduce the wear of these parts contacting with the work and maintain said wear at a minimum they are provided with contact points of very hard material such as diamonds set in the ends thereof. The tripping member is arranged to magnify the movement of the feeler rod 162 during the gradual reduction of the work and itself constitutes a part of a plurality of electric circuits which are successively broken as the diameter of the work approaches and finally reaches the precise measurements required.

To adjust the calipering device so that the machine may produce work pieces of different sizes, we provide the connection between the tripping lever and feeler rod 162 with an adjustable micrometer screw 170 which is preferably provided with indicating marks 171 for reference with a fixed index point 172 so that the setting of the feeler rod may be predetermined and thereby cause the machine to automatically and precisely grind work pieces to any required size. The L shaped tripping member is made of an upper casting 174 which is combined with an intermediate casting 175 and a lower casting 176, such castings being fastened together by screws 178 as shown in Figs. 5 and 6. A short contact arm 180 extending to the right is secured as by rivets to the top of said combined parts as shown in Fig. 5 while at the bottom of said parts is riveted a long contact arm 182, these arms serving to form part of electric circuits as will be later described.

The accuracy of this calipering device as illustrated is greatly increased due to a special type of anti-friction mounting. This mounting embodies, as shown in Figs. 6 and 7, two diametrically opposed studs 184 and 186 extending through supporting bosses 188 in casing 160 and forming bearings for the tripping lever. Each of the studs 184 and 186 is provided with a V shaped groove 189 (Fig. 8) arranged to receive a pair of knife edges 191 and 192 formed at the opposite sides of the open frame casting 175. The line of knife edges which provides the fulcrum upon which the bell crank tripping lever is suspended, lies in the hub or vertex of the lever and near its center of gravity so that in the position shown in Fig. 5, the lever hangs approximately in a state of equilibrium. The frame 175 is further provided with a boss 195 threaded internally to receive the micrometer screw 170. Displacement of the tripping lever from the knife edge bearing resting on studs 184 and 186 is prevented by means of a spring pressed member 197 disposed between said knife edges and having a groove at its lower end to receive an upstanding intermediate knife edge 198 formed on the lower frame casting 176. A spring 200 is interposed between a boss 201 on the cover of the casing and a recess within a member 197 to maintain said member against the knife edge 198 and thereby press the tripping lever into its knife edge bearings. By maintaining the knife edge bearings in correct position, friction is reduced to a negligible amount.

To maintain the tripping lever in constant and firm contact with feeler rod 162 so that the micrometer screw 170 will always engage the upper end of said rod, we provide a spring 203 positioned within a hollow boss 204 in the cover of casing 160 and arranged to resiliently engage the flat outer end 205 of the intermediate frame 175 (Fig. 5). A threaded plug 206 holds the spring 203 within the hollow boss and permits adjustment of its tension against the tripping lever.

The movement of the tripping lever may be communicated to the grinding machine so as to control the fluid pressure operated wheel feed mechanism in various ways, but as herein illustrated, this communication is effected by means of electric circuits which are successively broken as the feeler rod 162 moves downwardly and the tripping member is swung about its knife edge bearings by spring 203, which maintains the tripping lever in contact with the upper end of the feeler rod and the lower end of said rod in positive engagement with the work during the grinding operation. Since this engagement between the tripping member and the feeler rod, and also the engagement between the tripping member and its knife edge support is assisted at all times by gravity, the springs 200 and 203 must necessarily be extremely light to produce the least possible effect upon the calipering action of said tripping member. As illustrated, the electric circuits include contact members 210 and 211 which comprise flat springs firmly attached at one end to the casing but electrically insulated therefrom. The outer or right hand end of contact spring 210 is secured by screws to a block of insulating material 214 mounted within the casing. The spring 210 is provided with a block of insulation 215 which is engaged by the upper end of an adjusting screw 217 having a lock nut 218 whereby its position may be adjustably determined. The tension of spring 210 is such that it always bears against the tension screw 217 until it is lifted therefrom by a contact point 219 on arm 180 of the tripping member as the calipering device is applied to a fresh work blank when the feeler rod 162 and tripping lever are consequently displaced. As the grinding operation progresses and as the work is reduced in size, the tripping member will swing in a clockwise direction, lowering arm 180 until the contact point 219 finally separates from the contact spring 210.

In a similar manner, contact spring 211 is mounted upon a block of insulation 220 secured to a portion of the casing 160 and engages a contact point 222 on the lower end of contact arm 182. This spring also is provided with an insulating separator 224 which is engaged by the end of an adjusting screw 225 secured in adjusted position by a lock nut 226. The adjustment of screw 217 is such that the contact between arm 180 and spring 210 will be broken when the desired diameter of the work is approximated and prior to the time when further movement of the contact spring 211 is prevented by screw 225. The electric circuit through the contact arm 182 and spring 211 will be broken at a later time when the work size has been reduced to the precise dimension required.

The breaking of contact between arm 180 and spring 210 will be effective, as will be later described to stop the infeed of the grinding wheel and to permit a continued light contact between the wheel and rotating work to perform a finishing cut on the work so as to reduce it to the final required dimension. From the preceding description it will be apparent that the design of the caliper as herein described is such that the absolute tension upon springs 200 and 203 cannot affect the action of the device, nor can the tension of contact springs 210 and 211. As long as there is any tension in these springs to hold the parts in position and prevent chattering, the action of the caliper device in successively breaking the control circuits will be positive and since the control circuits involve low voltages as will be explained later, there will be no appreciable arcing between the contact springs and the contact arms as the circuits are broken. Due to the action of spring 203 there will be no electrical contact between the arm 180 and spring 210 when the calipering device is lifted out of engagement with the work to a position such as shown in Figure 10. Since the breaking of contact between arm 180 and spring 210 serves to stop the infeed of the grinding wheel, we have provided an additional switch 230 which serves the same purpose and is automatically closed whenever the calipering device is lifted clear of the work as shown in Figure 10, thus maintaining the proper electrical circuit so that the operator may start the grinding wheel feeding forward when the calipering device is removed from the work. Switch 230 is so constructed that it breaks electrical contact while the calipering device is being swung down into operative position, so that breaking the electrical connection between arm 180 and spring 210 may be utilized to stop the infeed of the grinding wheel at the proper time during the grinding operation.

The calipering device is preferably mounted upon a bracket 231 rigidly secured to the grinding wheel guard. Bracket 231 supports an upright post 233 upon which is slidably mounted a member 234 clamped thereon by a screw 235. A member 236 is frictionally and pivotally secured to support member 234 by means of a bolt 237 provided with a clamp nut 238 so that member 236 may be angularly moved relative to its supporting member when the calipering device is swung from an operative position (Fig. 9) to an inoperative position (Fig. 10). The members 234 and 236 are provided with ears 239 and 240 respectively which limit their angular movement when the calipering device is swung into operative position as shown in Fig. 9. A bracket 242 is secured at the forward end of a rod 244 which has its other end slidably clamped within member 236 by means of a clamping screw 245. A link 247 is pivotally mounted at the lower end of bracket 242 by means of a bolt 248 and serves to pivotally support the caliper device at its forward end by means of a bolt 250 which passes therethrough and pivotally secures it to a depending lug 251 on the calipering device.

In order to properly support the calipering device, we have provided link 247 with an upstanding arm 255 terminating in a cylinder 256 within which is a spring pressed plunger 257 which is held under pressure against a surface 259 on bracket 242 by a coil spring 260 within cylinder 256 and thereby tending to swing link 247 in a clockwise direction about its pivot bolt 248 and lift the calipering device. The pressure of the spring 260 is sufficient to overcome the weight of the calipering device and serves to maintain the caliper contact screw 166 in positive frictional contact with the lower side of the work. It will thus be seen that the action of plunger 162 is in no way affected by the weight of the caliper device. As clearly illustrated in Figs. 9 and 10, the bracket 242 is provided with a lug 262 which may engage the arm 255 of link 247 and limit its swing in a clockwise direction. When lug 262 engages arm 255 switch 230 is closed making electrical contact as shown in Fig. 10. Switch 230 comprises two spring contact members 264 and 265 secured to insulating blocks 266 and 267 respectively fastened on bracket 242 and arm 255 as shown in Fig. 9.

Clamping screws 245 and 235 are utilized to secure the members 236 and 234 upon rods 244 and 233 so that when the device is swung down into operative position as shown in Fig. 9, lug 262 is out of engagement with arm 255 and ears 239 and 240 are in positive engagement so that spring 260 may be utilized to support the caliper device and maintain contact screw 166 in positive frictional engagement with the bottom of the work during the entire grinding operation. Link 247 is provided with a flat surface 270 which engages a flat surface adjacent lug 251 when the caliper is swung away from the work and thereby serves to prevent free swinging of the caliper device when swung out of operative position, as shown in Fig. 10. Lug 251 is located slightly to the right of the center of gravity of the calipering device, thus causing a tendency for said calipering device to swing about pin 250 in a counterclockwise direction and maintain contact screw 168 in frictional contact against the side of the work during the entire grinding operation.

Since switch 230 is opened as soon as the operator starts to swing the calipering device into operative position, and since it is desired to keep the circuit controlled by said switch closed until the caliper is in engagement with the work, we provide a manually operated switch connected in parallel with switch 230 and which may be held closed by the machine operator while the caliper is being moved to operating position. This switch as shown in Fig. 5 comprises two spring contact members 272 and 273 normally held out of contact and insulated from each other and the caliper frame by blocks of insulation. These contact members may be brought into engagement by means of a button of insulating material 274 slidably mounted in the lower front part of the caliper frame in a position where the machine operator would naturally grasp said caliper device to swing it into operative position.

To avoid arcing, we utilize a low energy circuit which operates through a relay to control a high energy circuit of the type required for operating the solenoids. As is apparent from an inspection of Fig. 1, there is indicated a low voltage source of energy such as a battery 276, one side of which is connected by the wire 277 to a manually operated switch 278, conveniently located on the front of the machine and utilized to prevent a drainage of said battery when the machine is not in operation. The other side of said switch 278 is connected to arms 180 and 182 of the tripping member through a wire 280. The other side of the battery 276 is connected through wires 281 and 282 to the electromagnets of electromagnetic relays 284 and 286 which are diagrammatically illustrated in Fig. 1 but which will be understood to be of such construction in actual practice that the circuit controlling members thereof can be interposed in a high voltage circuit such as commonly found in commercial installations. The other side of the magnet coil of relay 284 is connected through a circuit 287 to the contact spring 210, and also through connecting wires 288 and 290 to spring contact member 273 of the manually operated switch within the front of the caliper frame and to the contact member 264 of automatic switch 230. It will be noted that since said manual switch and automatic switch 230 are both open when the caliper head is upon the work, current will flow from battery 276 through wire 277, switch 278, wire 280 into the tripping member and out through contact member 210, to arm 180, through circuit 287, electro-magnet of relay 284 and back to the battery through wire 281 thus completing the circuit and energizing relay 284 when the electric current is free to flow between the arm 180 and contact member 210. The other end of the magnet coil of relay 286 is connected through a lead 292 to the contact spring 211 at the lower end of the calipering device thus completing a low voltage battery circuit through the magnet coil and energizing relay 286 when arm 182 of the tripping lever engages spring contact member 211. Relay 284 is utilized to control the termination of the wheel infeed and relay 286 is utilized to cause a reversal of the fluid pressure reverse valve 95 and, thereby cause the grinding wheel to rapidly withdraw from the work to an initially remote position.

Accordingly, a solenoid 294 is secured to the base of the machine by brackets 295 (Figs. 3 and 4) above the head 149 of bell crank 144. An armature 297 is slidably mounted within solenoid 294 and is provided with a yoked portion at its lower end which is pivotally connected by a pin 298 to a link 300 also pivotally connected by a pin 301 to a yoked portion 302 at the top of head 149. Solenoid 294 is provided with a winding, one end of which is connected by a wire 304 to a power line and the other end of which is connected by a wire 305 to a screw 307 which electrically contacts with a movable arm 308 of relay 284 only when the electromagnet of said relay is de-energized. The movable arm 308 is always connected to the other side of the power line by a wire 310. It will thus be apparent that when electromagnet of solenoid 284 is de-energized by breaking of contact between arm 180 and contact spring 210, the solenoid 294 will be energized by a flow of electrical current from the power line through wire 304 through said solenoid and back to the power line through wire 305, contact screw 307, arm 308 and wire 310. When solenoid 294 is energized a pull is exerted upon armature 297, which is composed of a non-residual magnetic material such as soft iron, acting through link 300 to lift head 149 and rock bell crank lever 144 sufficiently about shaft 138 so that neither the stud 150 nor screw 152 will impede the movement of piston rod 124 towards the left, thereby permitting the action of throttle valve spring 129 to instantly force piston 123 over exhaust port 127 and terminate the infeed of the grinding wheel.

A solenoid 315 is controlled by the relay 286 and is secured in a fixed position relative to the reverse valve by a bracket 317. Armature 318, which is composed of a non-residual magnetic material such as soft iron, is slidably mounted within said solenoid and pivotally connected at one end by a pin 319 to a depending member 320 secured to the end of the reverse valve piston rod 102. When the reverse valve is in a position to cause an infeed of the grinding wheel as shown in Figs. 1, 12, and 13, the armature 318 is partially withdrawn from the solenoid towards the left. However, when electric current is applied to energize solenoid 315, the armature 318 is instantly drawn toward the right and acts through pin 319 and depending member 320 and thereby serves to shift the reverse valve to a position causing a rapid withdrawal of the wheel from the work as clearly shown in Figures 2, 4, and 15. Solenoid 315 is provided with a winding, one end of which is connected by a wire 322, joining wire 304 of the power line and the other end of said solenoid is connected by a wire 324 to a contact screw 325 which electrically contacts with a movable arm 326 of relay 286 only when the electromagnet of said relay is de-energized. The movable arm 326 is always connected to the other side of the power line by a wire 328 joining wire 310 of the power line. It will, therefore, be apparent that when the electrical magnet of relay 286 is de-energized by breaking contact between arm 182 and contact spring 211, the solenoid 315 will be energized by a flow of electrical current from the power line through wires 304 and 322, through said solenoid and back to the power line wire 310 through wire 324, contact screw 325, arm 326 and wire 328, thus causing armature 318 and the reverse valve piston to shift from their respective positions as shown in Figs. 1 and 12 to the reverse position as shown in Figs. 2, 4, and 15, whereupon the grinding wheel will rapidly be withdrawn from the work to its initial starting position.

The shifting of the reverse valve 95 to a forward feeding position is accomplished mechanically through the manual shifting of lever 103. Lever 103 is fastened at one end of a shaft 330 journaled within a bracket 331, firmly secured to the base 10 of the machine. An arm 333 keyed at the other end of shaft 330 is provided with a head 334 at its upper end, engageable with the end of armature 318 projecting through solenoid 315. Lever 103 is normally held in a substantially vertical position by means of a spring pressed plunger 335 slidably mounted within bracket 331. As illustrated in Figures 1, 2, and 11, the bottom of lever 333 is provided with an inverted V portion 337 engageable by a corresponding V portion 338 upon the top of plunger 335 which is resiliently urged into position by a coil spring 339. It will thus be apparent when the reverse valve is in such a position as to cause a reverse wheel feed as shown in Figure 2, it is only necessary to rock lever 103 to position 103a whereupon lever 333 will move through a corresponding angular movement and the head 334 of said lever will engage the end of armature 318 moving it towards the left until the reverse valve has been shifted to a forward feeding position as shown in dotted lines in Fig. 2. When the operator takes his hand from lever 103 spring pressed plunger 335 will serve to return said lever to its initial upright position.

Shifting of lever 103 to an operative position also serves to simultaneously close two switches 341 and 342 which are connected in the low voltage circuit and serve to de-energize solenoids 294 and 315 in a manner later to be described. Switches 341 and 342 are composed of two sets of spring contact members 344, 345, 347 and 348 secured to bars of insulating material 349 and 350. Bracket 331 is provided with an upstanding portion 353 within which is secured a stud 354 arranged to pivotally support a link 355. Link 355 is provided with a depending portion to which is secured the insulating bar 349 having fixed contacts 344 and 347 depending therefrom at each end respectively. Insulating bar 350 is rigidly secured to bracket 331 and switch contact members 345 and 348 are fastened at each end of said insulating bar so that said contact members 345 and 348 may be simultaneously engaged by the contact members 344 and 347 as link 355 angularly moves on stud 354 in a counterclockwise direction. In other words, switches 341 and 342 may be simultaneously closed or opened dependent upon the direction and extent of angular movement of link 355 its supporting stud 354. A horizontally disposed member 358 is slidably supported at one end upon armature 318 and pivotally supported at the other end upon a pin 360, passing through a yoke portion 361 in the upper part of link 355. A coil spring 363 is maintained under constant tension between a stud 364 on the lower portion of lever 333 just above shaft 330 and stud 360 tending to slide member 358 towards the left and close switches 341 and 342. The movement of member 358 towards the left is limited by its engagement with the solenoid casing at which position both of the switches 341 and 342 are closed. Member 358 is provided with a depending portion 366 having a vertical face 367 engageable with the end of armature 318 and a cam face 368 engageable with the head 334 of lever 333. When solenoid 315 is energized, armature 318 instantly moves toward the right shifting the reverse valve and at the same time the end of said armature engages surface 367 moving member 358 rearwardly and rocking link 355 in a clockwise direction to open both switches 341 and 342 as shown in Figure 2.

When the starting lever 103 is rocked towards its operative position 103—A, switches 341 and 342 are closed thereby just prior to the reversal of the reverse valve to a forward feeding position. When the reverse valve is in a reverse feeding position as shown in Figure 2, the end of armature 318 serves to engage vertical face 367 on member 358 and maintain said member in such a position that switches 341 and 342 are both open. As illustrated in Figure 11, when lever 103 is moved towards its operating position, the head 334 of lever 333 engages cam face 368 and lifts member 358 from engagement with the armature 318 just prior to the engagement of head 334 with said armature. As soon as member 358 has been disengaged from said armature, spring 363 acts to slide member 358 towards the left and rock arm 355 in a counterclockwise direction upon stud 354 thereby simultaneously closing switches 341 and 342 prior to the reversal of valve 95. When armature 318 has been moved to its extreme left position to shift the reverse valve to a forward feeding position it projects just sufficiently through the solenoid to support member 358 as shown in Figure 12 and the action of spring pressed plunger 335 serves to return levers 103 and 333 to their respective normal positions.

Switches 341 and 342 when closed, serve to maintain the electromagnets of relays 286 and 284 respectively energized whereby solenoids 315 and 294 will be de-energized and exert no action upon their respective armatures 318 and 297 when the starting lever 103 is thrown to operative position 103a and the caliper device is removed from the work.

Switch 341, which is connected in the low voltage circuit of relay 284, serves to maintain said circuit closed until the caliper is in positive engagement with the work and thereby preventing feed control solenoid 294 from becoming energized during the starting of the machine. The upper spring contact member 344 of switch 341 is connected by a wire 370 joining battery lead 277. The lower contact member 345 of said switch is connected by a wire 372 to both of the spring contact members 265 and 272 on switch 230 and the manual control switch in the front of the caliper frame. It will be remembered that during the grinding operation, electrical contact between spring 210 and arm 180 is necessary to maintain the feed control solenoid 294 de-energized and that said electrical contact is broken when the caliper device is removed from the work. Since, in the normal operation of this machine the calipering device is not engaged with the work until the grinding cycle has started, unless other electrical circuits are provided, the feed control solenoid 294 will be energized and act upon armature 297 to lift head 149 of lever 144 permitting the feed control valve spring 129 to instantly close said feed control valve before the grinding wheel engages the work and thereby stopping the machine and making it inoperative. This difficulty is overcome by providing switches 341, 230 and the aforementioned manually controlled switch within the caliper casing. It will thus be apparent when the caliper is disengaged from the work at the start of a grinding cycle, electric current may flow from battery 276, through wires 277 and 370, through switch 341 and wire 372, through either switch 230 or the manually controlled switch and respective wires 288 or 290, back through wire 287, into the electromagnet of relay 284 and back to the battery through wire 281 thus completing the circuit and maintaining the feed control solenoid 294 de-energized. It should be noted, however, that as soon as the calipering device is engaged with the work, the electric control of relay 284 is entirely dependent upon the electrical contact of arm 180 and contact member 210 since both the manual switch within the caliper and switch 230 are open at this time.

Switch 342, which is operated simultaneously with switch 341, is closed by the movement of lever 103 and just prior to the shifting of reverse valve 95 to a forward wheel feeding position and serves to de-energize reverse solenoid 315 so that armature 318 therein may be shifted toward the left. It will be remembered that during the grinding cycle, when the electrical contact between arm 182 and spring contact 211 breaks, the electromagnet of relay 286 is de-energized and solenoid 315 is thereby energized exerting a pull upon armature 318 and reversing the valve 95 to a reverse feeding position. Since said electric contact between arm 182 and spring 211 remains broken when the caliper is disengaged from the work, other electrical switches and circuits have been provided whereby the reversing valve solenoid may be de-energized during the start of the grinding cycle before the caliper is applied to the work. To accomplish this, we have provided a switch 375 automatically operated by bell crank lever 144 and connected in series with switch 342 to maintain a closed circuit to the electro-magnet of relay 286 and thereby short circuit the connection between arm 182 of the tripping lever and contact spring 211, said connection being effected from the start of the wheel infeed until said feed changes to a grinding feed at which time switch 375 will be automatically opened transferring the electrical control of relay 286 and solenoid 315 to the calipering device. Switch 375 may comprise any electrical switch which will automatically open when lever 144 is rocked counter-clockwise upon shaft 138 to present screw 152 in the path of piston rod 124, but in the present instance comprises two spring contact members 377 and 378 firmly secured to insulating blocks 380 and 381 respectively secured to arm 148 of bell crank lever 144 and to the base 10. The insulating blocks and spring contact members 377 and 378 are so located that said contact members engage each other when lever 144 rests in its normal position (Figure 1) and are separated just as the action of collar 135 on cam 157 serves to rock lever 144 and presents screw 152 in the path of piston rod 124. It will be noted that when a fresh work blank is placed in grinding position and lever 103 is moved toward operative position, switch 341 is closed serving through relay 284 to de-energize solenoid 294 and permits the action of gravity to swing lever 144 to normal position presenting stud 150 in the path of rod 124 and closing switch 375. Switch 342 is simultaneously closed with switch 341, hence electric current is free to flow from battery 276 through wires 281 and 282 through the electromagnet of relay 286 and out through wire 292 to contact spring 211. Since the caliper has not yet been placed upon the work, current cannot flow from said spring 211 to the tripping lever arm 182 since said members are not engaged until the caliper is placed upon the work. Wire 292 is joined by a wire 382 to the upper contact member of switch 342. Since said switch is closed, current may flow therefrom through a wire 385 connected to contact member 377 of switch 375, out from the lower contact member 378 through wires 383 and 277 back to the other side of the battery. It will thus be apparent that this low voltage circuit will control relay 286 until switch 375 is broken when the grinding feed takes place at which time electrical control of said relay is transferred to the contact of arm 182 with spring contact 211 through contact point 222 whereupon the calipering device will act to control the precise moment at which the reversal of wheel feed takes place.

The operation of our machine will be readily apparent from reference to the drawings. A work blank 22 is first mounted in grinding position between the head stock and tailstock. At this time the grinding wheel 12 is at an initially remote position with the associated feeding mechanism positioned as shown in Fig. 2 and the calipering device withdrawn from the work as shown in Fig. 10 causing switch 230 thereon to be closed. The battery switch 278 is then closed to connect the low voltage battery 276 in the primary circuit.

To start the grinding wheel feeding rapidly towards the work for an automatic grinding cycle, the operator first moves lever 103 to position 103a, closing switches 341 and 342 and mechanically shifting the reverse valve 95 from its position shown in Fig. 2 to a forwarding feeding position as shown in Figs. 1 and 12. Switches 341 and 342 are closed by lever 103 just prior to the shifting of the reverse valve 95 and said switches serve to de-energize solenoids 294 and 315, thereby preventing the speed control valve 121 from closing until operated by other mechanisms and preventing a reversal of reverse valve 95 prior to positioning the caliper device upon the work at the start of the grinding cycle. At this time, electric current will flow from battery 276, through wire 277, wire 370, through switch 341, wire 372, switch 230, wire 290 and 287 and from thence back to the electromagnet of relay 284, through said relay and from thence back to the battery through wire 281 thereby maintaining a closed circuit and holding relay arm 308 from contact screw 307 so that the power circuit will not be connected to energize the feed control solenoid 294. Electric current will also flow from the battery 276, through wires 281 and 282 into the electromagnet of relay 286, out through wire 292 and wire 382, through switch 342, wire 385, and switch 375 which is closed since bell crank lever 144 is in its normal position, and back to the battery 276 through wires 383 and 277, thereby completing the electric circuit through the electromagnet of relay 286 and maintaining relay arm 326 from contact with screw 325 and de-energizing solenoid 315 so that lever 103 may be utilized to mechanically shift the reverse valve 95 to a forward feeding position as shown in Figs. 1 and 12.

When the reverse valve 95 has been shifted to a forward feeding position by means of lever 103, fluid is free to flow from supply tank 92 through pipe 91 into pump 89 and from thence under pressure through pipe 93, port 94, chamber 110 of the reverse valve into port 104, and out through port 107 into the wheel feed cylinder causing a forward feeding movement of the grinding wheel toward the work. Exhaust fluid is forced from the wheel feed cylinder 45 during the forward feeding movement of the grinding wheel through port 108 and into the reverse cylinder 95 through port 105, out through port 114 into the speed control cylinder 121 through port 120 and back to the supply tank through port 127 and pipe 128. Port 127 is wide open at this time, since bell crank lever 144 rests in its normal position presenting stud 150 in the path of piston rod 124 and thereby maintaining a free exhaust causing a rapid infeed of the wheel.

During said initial feed of the grinding wheel, the operator positions the caliper device upon the work. While swinging said caliper device into operative position, switch 230 automatically opens but the circuit connected with said switch is maintained closed until the caliper is on the work due to a manually operated switch operated by button 274, which lies normally within the operator's grasp as he swings the caliper into position. When the caliper has been placed upon the work, electrical control of relay 284 is directly dependent upon the contact of arm 180 with contact member 210 within the caliper casing so that when said contact is broken due to reduction of the work, the infeed of the wheel will be automatically stopped.

The rapid infeed of the grinding wheel continues until just prior to the contact of wheel and work at which position collar 135 engages cam 157 and rocks lever 144 presenting screw 152 in the path of piston rod 124 permitting partial closure of exhaust port 127 and definitely regulating the grinding feed. The rocking of lever 144 also serves to automatically open switch 375 transferring the control of electromagnet of relay 286 to the contact of arm 182 with contact spring 211 within the caliper, so that when said electrical contact is broken due to further reduction in work size, the wheel will be automatically and rapidly withdrawn from the work. When the work has been ground almost to the required size, the caliper action breaks electrical contact between arm 180 and contact spring 210 de-energizing the electromagnet of relay 284 and permitting arm 308 thereof to engage screw 307 and connect the power circuit to relay 294 which in turn acts through armature 297 to lift screw 152 from engagement with rod 124 whereupon exhaust port 127 is instantly closed and the wheel infeed stopped at a predetermined position.

Due to stresses and strains within the machine, a slight further grinding action will occur although the wheel infeed has been terminated. During this light further grinding action, commonly referred to as the sparking out of the wheel, the work reaches its final grinding size at which time the caliper action breaks the electrical contact of arm 182 with the contact spring 211 de-energizing the electromagnet of relay 286 and permitting relay arm 326 to make electrical contact with screw 325 whereby solenoid 315 will be energized by the power line and instantly move armature 318 toward the right and shift reverse valve 95 to a reverse feeding position as shown in Fig. 2. When the armature 318 is moved to this position, it engages the depending portion 366 of member 358 forcing said member toward the right to move link 355 and open both switches 341 and 342. Fluid may now flow from pump 89 under pressure through pipe 93 and port 94 into chamber 110 of the reverse valve from which it is directed into the forward end of the wheel feed cylinder through connecting ports 105 and 108 causing piston 46 to move toward the right and produce a consequent withdrawal of the wheel from the work, which continues until the end of piston rod 47 engages stop screw 131 adjusted to limit the initial position of the grinding wheel when it is remote from the work as shown in Fig. 2. The grinding wheel will withdraw rapidly from the work at this time since a free exhaust of fluid is provided through ports 107, 104, 112 and pipe 116 as shown in Fig. 2. The calipering device may now be swung to an inoperative position as shown in Fig. 10 and the finished work piece may be replaced by a fresh work blank whereupon the machine is ready to go through another automatic grinding cycle.

We claim:

1. A grinding machine comprising a work support and a grinding wheel which are relatively movable towards each other, a fluid pressure system arranged to feed the grinding wheel towards and from the work which includes a valve mechanism to regulate the rate of and to stop the wheel feed, automatic means to operate the valve mechanism and change the rate of wheel movement to a slower feed when the wheel reaches a predetermined position relative to the work, an electrical circuit, means whereby the current flow is varied therein in response to minute changes in work size, and electrically controlled mechanism responsive to variations in said current flow which operates the valve mechanism and stops the wheel feed when the work has been reduced to a predetermined size.

2. A grinding machine of the type covered by claim 1 comprising a throttle valve which serves both to regulate the wheel feed and to stop the feed, and automatic mechanism which operates to partially close the throttle valve when the wheel reaches a predetermined position relative to the work, after which an electrically controlled mechanism responsive to a variation in work size serves to close the throttle valve and control the work size.

3. A grinding machine comprising a work support and a grinding wheel, a reversible fluid pressure wheel feed mechanism including a throttle valve arranged to regulate the rate and extent of wheel feed, a reversing valve and control mechanism therefor which serve to feed the grinding wheel towards and from the work, means to operate the throttle valve to regulate the wheel feed, a low energy electrical circuit, means whereby the current flow is varied therein in response to minute changes in work size, a high energy electrical circuit wherein the current flow is responsive to the current flow within the low energy circuit, and means automatically responsive to the current flow in the high energy circuit which operates the control mechanism and causes the throttle valve to be operated to control the extent of wheel feed and thereafter causes a reversal of the reversing valve when the work has been reduced to a final required size and withdrawal of the wheel from the work.

4. A grinding machine comprising a work support and a grinding wheel, a reversible fluid pressure wheel feed mechanism, including a valve and control mechanism therefor to reverse the direction of wheel movement and to control the rate of wheel feed, which serves to move the wheel at either a rapid or a slow feeding rate, means actuated automatically by rapid movement of the wheel to a predetermined position relative to the work which causes the valve mechanism to reduce the rate of wheel feed to a slow grinding feed, a low energy electrical circuit responsive to minute changes in work size, a high energy electrical circuit responsive to the low energy circuit, and means automatically responsive to the high energy circuit which operates the control mechanism and causes reversal of the valve when the work has been reduced to a predetermined size and withdrawal of the wheel from the work.

5. A grinding machine comprising a work support and a grinding wheel which are relatively movable towards each other, a fluid pressure operated mechanism arranged to feed the grinding wheel towards and from the work, a valve mechanism to regulate the rate of and to stop the wheel feed, automatic means to operate the valve mechanism and change the rate of wheel feed when the wheel reaches a predetermined position relative to the work, and a device responsive to a change in work size which serves to operate the valve mechanism and stop the forward wheel feed when the work has been reduced to a predetermined size.

6. A grinding machine comprising a work support and a grinding wheel, a fluid pressure operated mechanism arranged to feed the grinding wheel towards and from the work and including a throttle valve to regulate the rate of wheel feed and a reversing valve, and means including a device responsive to a change in work size which controls said valves and causes the throttle valve to be closed and stop the infeed of the wheel when the work has reached a predetermined size and leave the grinding wheel in grinding contact with the work and thereafter to cause the reversing valve to be operated to withdraw the wheel from the work when the work has reached a second predetermined size.

7. A grinding machine comprising a work support and a grinding wheel, a fluid pressure operated mechanism arranged to feed the grinding wheel towards and from the work, a throttle valve therefor, a reversing valve connected to said fluid pressure operated mechanism, a gauging device including a feeler engaging the work during the grinding operation, and means actuated by said device which controls said valves in such a manner that the throttle valve will be closed and stop the infeed of the wheel when the work has reached a predetermined size and the grinding wheel will be caused to dwell in said position until the work has been further reduced to its required final size, whereupon the reverse valve will be automatically reversed, causing the wheel to rapidly withdraw from the finished work.

8. A grinding machine comprising a work support and a grinding wheel, a fluid pressure operated mechanism arranged to feed the grinding wheel toward and from the work, a throttle valve therefor, means for controlling said valve whereby the rate of the infeed of the grinding wheel towards the work may be reduced at a predetermined position of the wheel relative to the work so as to cause first a rapid and thereafter a slower feed of the wheel, and a sizing device including a feeler engaging the work during the grinding cycle, which is connected to completely close the throttle valve and stop the infeed of the grinding wheel when the work has reached a predetermined size.

9. A grinding machine of the type covered by claim 8 in which means is provided for adjusting the position of the wheel at which the rate of wheel feed is changed.

10. A machine of the type covered by claim 8 in which means is provided for varying the slower rate of wheel feed during the grinding operation.

11. A grinding machine comprising a work support, a grinding wheel, a reversible fluid pressure actuated motor to move the wheel and work relatively to cause a grinding operation, valve mechanism controlling the motor to stop and to reverse the same, and electric control mechanism responsive to a change in work size during the grinding operation which controls the valve mechanism and comprises two low energy electric circuits and two high energy circuits controlled thereby, and means actuated by one high energy circuit which operates the valve mechanism and stops the forward wheel feed when the work has reached a predetermined size and means operated by the other high energy circuit which serves to reverse the wheel feed when the work has reached a smaller predetermined size.

12. A grinding machine comprising a work support, a grinding wheel, a reversible fluid pressure actuated motor to move the wheel and work relatively to cause a grinding operation, valve mechanism controlling the motor to stop and to reverse the same, mechanism to actuate the valve mechanism, a gauging device including a feeler engageable with the work during the grinding operation, electrical mechanism including two low energy circuits controlled by the movement of the feeler to two different successive positions, two high energy circuits respectively responsive to said low energy circuits and arranged to operate the valve actuating mechanism in response to the two different positions of the feeler and to stop the forward feed of the wheel when the work has reached a predetermined size and to reverse the wheel feed when the work has reached a smaller predetermined size.

13. A grinding machine comprising a work support and a grinding wheel, a fluid pressure operated mechanism arranged to feed the grinding wheel toward and from the work, a control valve arranged to regulate the rate of wheel feed and a reverse valve connected to said fluid pressure mechanism arranged to cause the grinding wheel to stop or to approach or recede from the work, a gauging device including a feeler engageable with the work during the grinding operation, and separate electrical devices controlled by the gauging device and responsive to movement of the feeler which serve to actuate said valves successively, whereby the control valve will first close and stop the wheel infeed when the work has been reduced to a predetermined size and the grinding wheel will be caused to dwell in said position until the work has been further reduced to its required final size, whereupon the gauging device will cause the reverse valve to be shifted to a reverse position, serving to withdraw the wheel from the work.

14. A grinding machine comprising a work support and a grinding wheel, a fluid pressure system including a piston and cylinder arranged to move the grinding wheel towards and from the work, a control valve for the fluid pressure system, a solenoid connected to close said valve, a reverse valve to control the direction of wheel feed, a solenoid connected to operate said reverse valve, a gauging device having a movable feeler engageable with the work being ground, electrically operated means responsive to one position of said feeler which is connected to the control valve solenoid to stop the infeed of the grinding wheel and electrically operated means responsive to a second position of said feeler when the work has been further reduced to a predetermined size which actuates the reverse valve solenoid and causes the grinding wheel to be withdrawn from the work.

15. A grinding machine comprising a work support and a grinding wheel, a fluid pressure operated mechanism including a piston and cylinder arranged to feed the grinding wheel toward and from the work, a control valve therefor, a reverse valve connected in the fluid pressure system to control the movement of the grinding wheel toward and from the work, a calipering device having a feeler arranged to engage the work during grinding, and electrically operated mechanism responsive to movement of the feeler and a reduction in work size connected to actuate said valves, including two electrical control circuits, electric switches in the circuits and means for operating the switches successively, whereby the control and reverse valves will be individually operated when the work is reduced to predetermined sizes, causing a termination of the wheel feed and a reversal thereof.

16. A grinding machine comprising a work support and a grinding wheel, a fluid pressure system including a motor arranged to feed the grinding wheel toward and from the work to cause a grinding operation, a reversing valve and a throttle valve in said system to reverse the direction of the wheel feed and to control its rate, an electrically operated mechanism including solenoids connected to operate the throttle and reversing valves successively, a sizing device including a feeler engageable with the work during the grinding operation, and electrically operated means connecting the sizing device and said mechanism to successively actuate the solenoids when the feeler has reached predetermined positions, whereby the grinding wheel may be caused to automatically approach the work and grind it to a predetermined size.

17. A grinding machine comprising a work support and a grinding wheel, a fluid pressure operated mechanism arranged to feed the wheel towards the work from an initially remote position and from the work to said position which includes a throttle valve and a reversing valve, automatic means to partially close said throttle valve when the wheel has moved from its remote position to a predetermined position relative to the work and thus decrease the rate of wheel feed, and means including a device responsive to a change in work size which causes the throttle valve to be closed and stop the infeed of the wheel when the work has reached a predetermined size and leaves the grinding wheel in contact with the work and which operates the reverse valve to cause the wheel to be rapidly withdrawn from the work to its initially remote position when the work has been reduced to a second predetermined size.

18. A grinding machine comprising a work support and a grinding wheel, a fluid pressure mechanism including a piston and cylinder arranged to feed the grinding wheel towards and from the work, a throttle valve for the fluid pressure mechanism to regulate the rate of wheel feed, means for controlling said valve whereby the rate of infeed of the grinding wheel may be reduced to a predetermined extent at any predetermined position of the grinding wheel relative to the work, a solenoid arranged to close the throttle valve, mechanism including a solenoid connected to operate a reversing valve to control the direction of the wheel feed, electrically operated valve control mechanism, including a calipering device having a feeler engageable with the work during the grinding operation, which is responsive to a reduction in work size and serves to energize the solenoids successively and stop the infeed of the grinding wheel when the work has reached a predetermined size and thereafter cause the wheel to withdraw from the work when the work has been further reduced to a predetermined size.

19. A grinding machine comprising a work support, a grinding wheel rotatably mounted on a wheel slide, a rotatable feed screw arranged to move the wheel slide and cause the grinding wheel to approach or recede from the work, a fluid pressure operated mechanism including a fluid pressure motor arranged to rotate said feed screw, a control valve arranged to direct the movement of said motor, electrically operated control mechanism for the control valve, a sizing device including a feeler engaging the work during the grinding operation and electrical connections between the sizing device and control mechanism arranged to operate the latter and stop the infeed of the wheel when the work has been reduced to a predetermined size.

20. A grinding machine comprising a work support, a grinding wheel rotatably mounted on a wheel slide, a rotatable feed screw arranged to move the wheel slide, a fluid pressure system including a fluid pressure motor arranged to rotate said feed screw in either direction, a reverse valve controlling the motor, electrically operated control mechanism for the reverse valve, a calipering device having a feeler engageable with the peripheral surface of the work being ground, a switch operated by said feeler and electrical connections including said switch and control mechanism arranged to shift the reverse valve and cause the wheel to withdraw from the work when the work has been reduced to a predetermined size.

21. A grinding machine comprising a base, a work support and a grinding wheel slide arranged to move a rotatably driven grinding wheel toward and from the work to cause a grinding operation, a feed screw rotatably mounted within the base and engageable with a threaded portion upon the wheel slide, a fluid pressure operated mechanism including a cylinder affixed to the base of the machine and a piston slidably mounted therein, a piston rod affixed to said piston at one end and provided with a rack at the opposite end, gear connections between said rack and the feed screw whereby a longitudinal movement of said piston will cause a corresponding rotation of the feed screw and a movement of the grinding wheel toward or from the work, a reversing valve arranged to direct the movement of the wheel feed, and a throttle valve arranged to control the rate of wheel feed.

22. A grinding machine comprising a base, a work support, a grinding wheel slide arranged to feed a rotatably driven grinding wheel toward and from the work, a fluid pressure operated mechanism to feed the wheel into or away from the work, a throttle valve arranged to regulate the rate of wheel feed, cam operated mechanism actuated in timed relation with the infeed of the wheel arranged to partially close the throttle valve and change the rate of wheel feed when the wheel has reached a predetermined position relative to the work, and a reversing valve arranged to direct the movement of the wheel feed toward or from the work.

23. A machine of the type covered by claim 22 comprising means for adjusting the cam mechanism and changing the position at which the wheel is located when the feeding rate is changed.

24. A machine of the type covered by claim 22 comprising means for adjusting the rate at which wheel feed operates after the cam mechanism has served to partially close the throttle valve.

25. In combination with a grinding machine having a work support and a grinding wheel movable towards and from the work, an electrically operated work size control mechanism comprising a gauging device including a feeler engageable with the work which is movable towards and from an operative position relative to the work, a power mechanism to move the wheel into and away from the work, electrical control mechanism operated in response to movement of the feeler when engaging the work which is connected to control the power mechanism and stop the feeding operation, and automatically actuated means which serve when the feeler is out of operative contact with the work to prevent the electrical control mechanism from responding to the position of the feeler and affecting the power mechanism.

26. A device of the type covered by claim 25 in which the gauging device is movably mounted on the machine for positioning the feeler in and out of operative relation to the work and a switch is provided in circuit with the electrical control mechanism which is operated by movement of the caliper head to render said circuit inoperative when the feeler is removed from operative relation to the work.

27. A grinding machine comprising a work support, a grinding wheel, a fluid pressure actuated motor arranged to move the wheel in either direction, towards and from the work, a throttle valve arranged to control the rate of feed of said motor, cam operated mechanism actuated in timed relation with the wheel feed and arranged to partially close the throttle valve and reduce the rate of wheel feed to a predetermined grinding rate when the wheel has reached a given position relative to the work, a solenoid connected to completely close the throttle valve, a reversing valve arranged to direct fluid flow to the motor and thereby control the direction of wheel feed, a solenoid connected to operate the reversing valve, a calipering device including a feeler engageable with the work during grinding, electric mechanism connected to control said solenoids which is operated by said feeler due to a reduction in work size, and serves to close the throttle valve when the work has been reduced to a predetermined size and to operate the reverse valve thereafter when the work has been further reduced to a predetermined size, thereby causing the wheel to rapidly withdraw from the work and means whereby said caliper control is rendered inoperative until the initial infeed of the grinding wheel is reduced to a grinding feed by said cam operated mechanism.

ALBERT G. BELDEN.
FRANK E. DROWN.